United States Patent [19]
Bigley

[11] Patent Number: 4,709,443
[45] Date of Patent: Dec. 1, 1987

[54] APPEARANCE FABRIC PANEL WITH IN SITU MOLDED FRAME

[75] Inventor: James E. Bigley, Warren, Ohio

[73] Assignee: The Scott & Fetzer Company, Twinsburg, Ohio

[21] Appl. No.: 877,005

[22] Filed: Jun. 20, 1986

[51] Int. Cl.⁴ .............................................. A47L 9/00
[52] U.S. Cl. ...................................... 15/339; 15/350; 55/DIG. 3; 264/257; 264/266
[58] Field of Search ................. 15/339, 350, 351, 347, 15/410, 327 R; 264/257, 266; 55/DIG. 3, DIG. 31

[56] References Cited

U.S. PATENT DOCUMENTS

| | | | |
|---|---|---|---|
| 2,633,596 | 4/1953 | Turner et al. | 15/350 X |
| 3,408,438 | 10/1968 | Staunton | 264/257 X |
| 3,491,519 | 1/1970 | Ettridge | 15/350 X |
| 3,879,797 | 4/1975 | Principe et al. | 15/410 X |
| 4,130,622 | 12/1978 | Pawlak | 264/257 X |
| 4,216,184 | 8/1980 | Thomas | 264/257 X |

Primary Examiner—Chris K. Moore
Attorney, Agent, or Firm—Pearne, Gordon, McCoy & Granger

[57] ABSTRACT

A relatively rigid, air permeable panel suitable, for example, as a diffuser on a hard box vacuum cleaner housing. The panel is a composite of fabric and a polymeric frame molded in situ on the fabric. The disclosed molded frame technique avoids the necessity of separate fastening means between the fabric and frame and obviates the need for edge finishing of the fabric.

23 Claims, 10 Drawing Figures

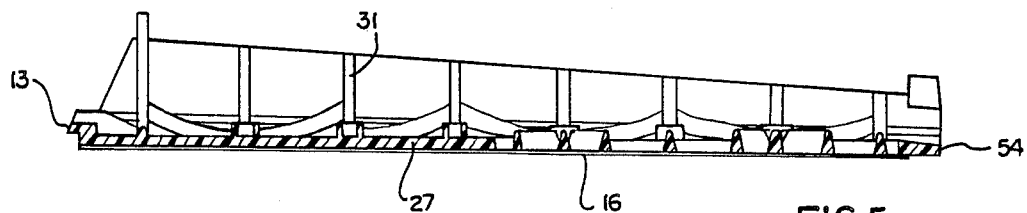
FIG.4
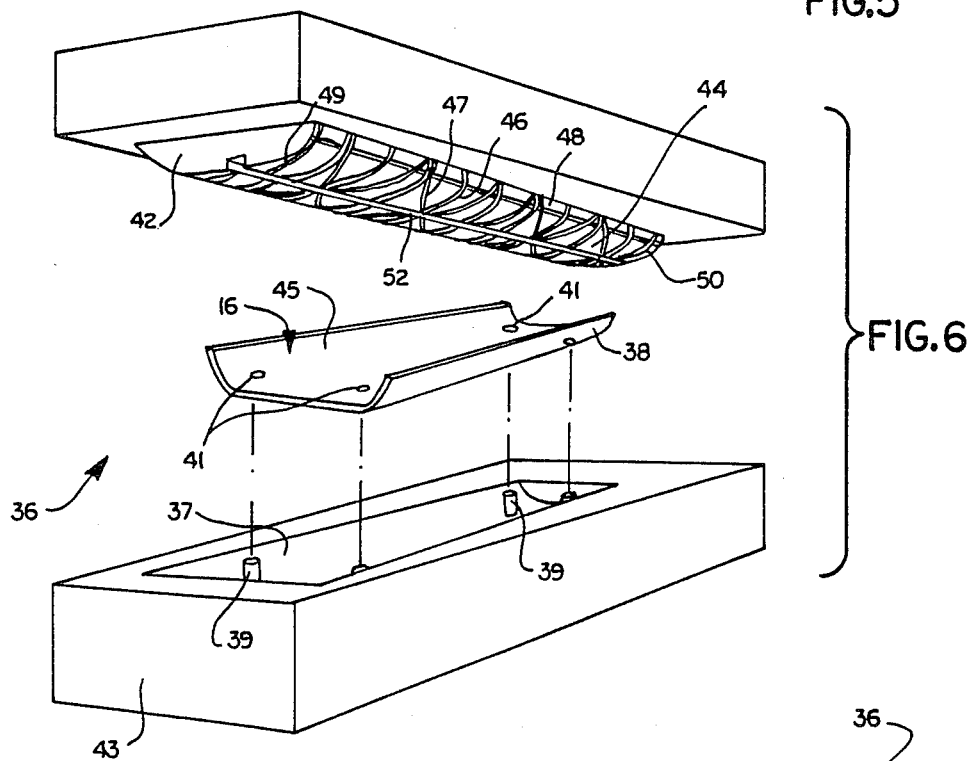
FIG.5
FIG.6
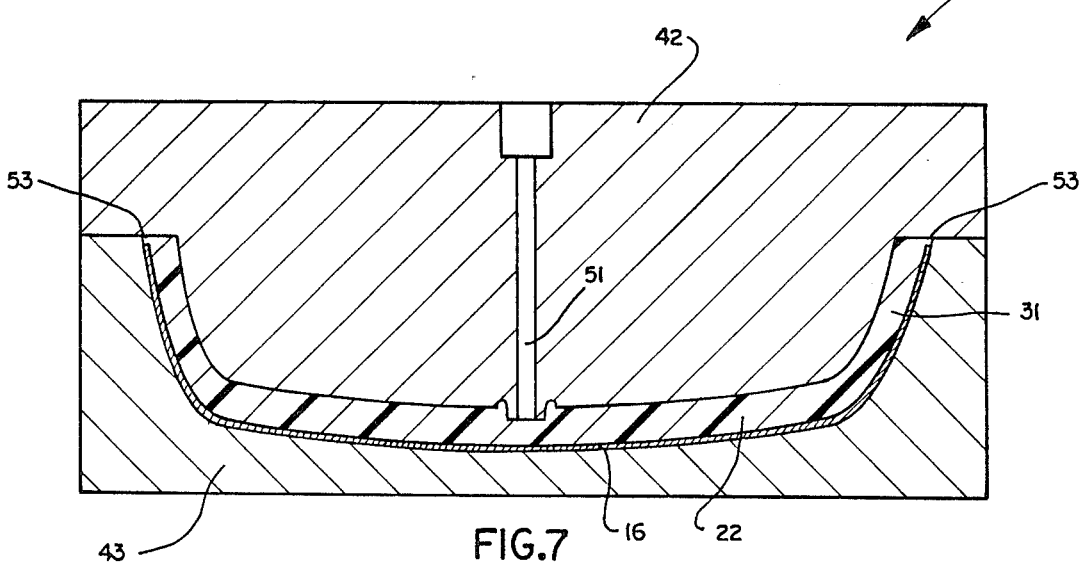
FIG.7

APPEARANCE FABRIC PANEL WITH IN SITU MOLDED FRAME

BACKGROUND OF THE INVENTION

The invention relates to the construction of breathable decorative panels and, more particularly, relates to composite panels of fabric and molded polymeric open framework.

Various products such as vacuum cleaners have exposed areas through which air circulates and for which it is desirable to provide a visually pleasing upholstered fabric appearance. Typically, upright vacuum cleaners are provided with fabric bags that are "soft" in the sense that they are not held to shape on a rigid frame. While a rigid frame can be used to define the shape of a fabric web to provide a finished integrated product appearance, this approach has not been successfully adopted, as far as known, in the vacuum cleaner industry. Possible reasons for this commercial absence in such goods is the expected high labor content associated with securing the fabric to the framework and finishing its edges. Where the exposed area of the fabric is of significant size, and it is desired that the frame be concealed, i.e. upstream in the air discharge flow of a vacuum cleaner, prior art fabric fastening techniques do not appear to be practical. Problems of the fabric ballooning out, stretching and separating from the frame, under the stress of high exhaust pressures from the vacuum motor unit can be anticipated.

SUMMARY OF THE INVENTION

The invention provides a composite frame and fabric panel construction which avoids significant assembly labor, secondary finishing operations and separate fasteners and/or adhesives. The fabric panel has sufficient strength, rigidity and resistance to permanent stretching to enable it to be employed as an air diffuser panel in a "hard box" vacuum cleaner unit. In such applications, the fabric panel improves performance of a vacuum cleaner by allowing a relatively large air diffusing area to be provided as compared to perforations, slots or the like ordinarily found in hard box vacuum cleaner units. This large diffusion area reduces the air velocity exiting the vacuum cleaner unit and thereby avoids strong air currents which could otherwise cause dirt to become airborne before it can be vacuumed from surfaces being cleaned.

In accordance with the invention, the panel is produced by molding a rigid frame in situ on a fabric web component. In the preferred embodiment, the fabric component is inserted in a mold cavity, the mold is closed and settable polymeric material is injected into the cavity. Where it contacts the fabric, the frame material tenaciously and permanently affixes itself to the fabric in a natural self-forming bond. Ideally, the fabric component is precut to its finished dimensions and the frame includes a perimeter portion which forms a selvage with the edges of the fabric and eliminates the need for any separate manual binding or other finishing steps or materials in this area of the panel.

Preferably, the frame is provided with an open network of stringer or rib elements which interconnect with the perimeter portion. Like the perimeter portion, the stringer elements are tenaciously and permanently affixed to corresponding areas of the fabric. The assured permanency of the bond between the frame stringers and fabric permits a panel of relatively large area to be used in severe service applications such as in a high performance vacuum cleaner unit without risk of separation between the fabric and frame and consequent unsightly ballooning and sagging of the fabric.

In the preferred embodiment, the fabric is a high performance synthetic material such as polyester which is a thermoplastic material. The frame is injection molded of another thermoplastic material such as ABS which is selected to have a melting temperature for molding less than that of the fabric so that the fabric structure is substantially unaffected during the frame molding process. In accordance with the invention, the frame material is modified by a filler material such as glass fiber which reduces the tendency of the frame to shrink upon cooling and setting and thereby avoids puckering or sagging of the fabric material. Additionally, the filler material increases the stiffness of the frame to improve its resistance to deflection under loads imposed during service.

BRIEF DESCRIPTION OF THE DRAWINGS

FIG. 4 is a cross sectional view of the diffuser panel taken along the line 4—4 of FIG. 3;

FIG. 5 is a cross-sectional view of the diffuser panel taken along the line 5—5 of FIG. 3;

FIG. 6 is a somewhat schematic exploded perspective view of a mold for forming a frame of the diffuser panel;

FIG. 7 is a cross-sectional view of the mold in a closed condition and settable polymeric frame material injected therein;

DESCRIPTION OF THE PREFERRED EMBODIMENT

Figure 8:
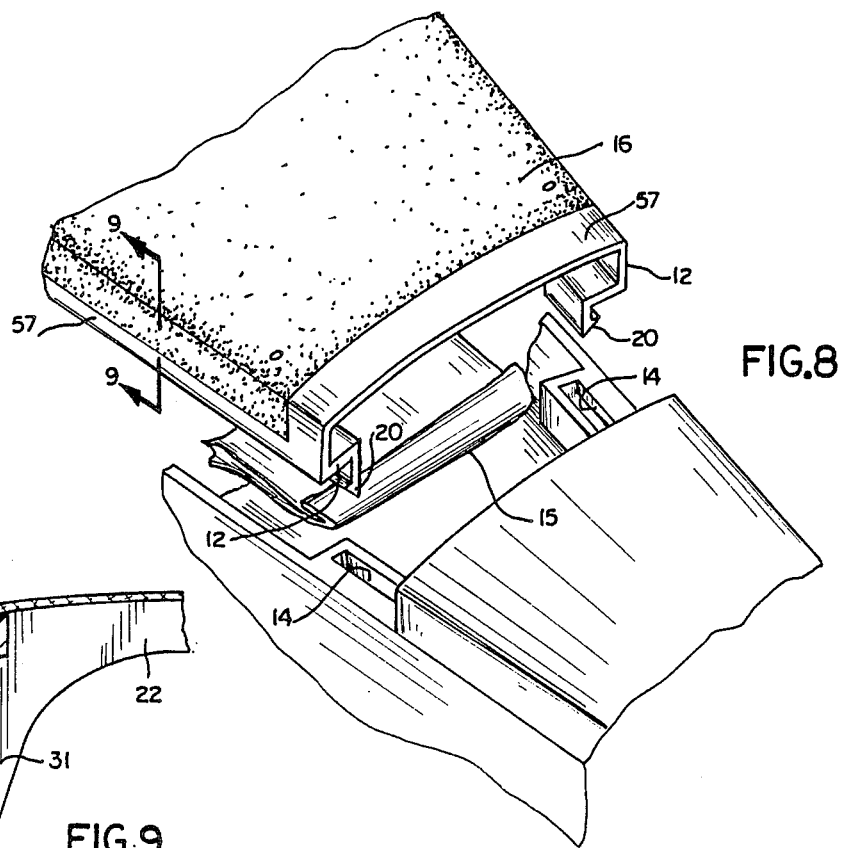
FIG. 8 is an enlarged fragmentary perspective view of the vacuum cleaner housing with an upper end of the diffuser panel in exploded relation therewith.

Referring now to the drawings, the invention is embodied in an air diffuser panel 10 for a lightweight upright vacuum cleaner 11 such as the unit disclosed in U.S. Pat. Application Ser. No. 807,806, filed Dec. 11, 1985. The vacuum cleaner 11 includes a vacuum motor unit 18 for drawing dirt laden air into a housing 19 and discharging it through a paper filter bag 15 retained in the housing by the cone or panel 10. As will become apparent from the following disclosure, the panel 10 has a generally rigid fixed form and is utilized to cover and retain a paper filter bag 15 (FIG. 8) within the housing of the cleaner 11. The cover panel 10 is retained by suitable tabs 12, 13 which are received in associated recesses 14 in the main housing body of the cleaner 11. The tabs 12 at the upper end of the cover 10 have outwardly facing hook areas 20 that are engageable and disengageable from the housing body by resiliently flexing the cover panel 10 to decrease its width and allow these tabs to pass in and out the complimentary shaped recesses 14.

The air diffuser cover panel 10, which has a shallow longitudinally tapered channel shape, comprises a fabric web 16 and a molded polymeric frame 17. The fabric web 16 is preferably a woven product made of synthetic polymeric thermoplastic material such as polyester. Suitable materials for the fabric are those used in the upholstery industry for furniture and fabric covered acoustical panels for office systems. The fabric material is selected with regard to its abrasion resistance, puncture resistance, wearability, durability and dimensional stability. Porosity or looseness of the weave of the fabric is selected to provide adequate air flow and discharge from the enclosed filter bag and vacuum motor unit. Preferably the fabric is washable in water.

Figure 9:
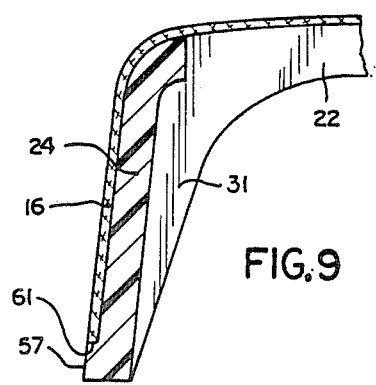
FIG. 9 is a greatly enlarged fragmentary cross-sectional view of the diffuser panel taken across the plane indicated by the lines 9—9 in FIG. 8.

The frame 17 includes a perimeter portion 21 and a network of ribs or stringers 22, 23 spaced throughout the area bounded by the perimeter portion. The ribs 22, 23 are integral with the perimeter portion 21. The perimeter portion 21 includes longitudinally extending side members 24 and transversely extending end members 25, 26. A longitudinal main rib or runner 27 extends from one end 25 to the other end 26 of the frame 17 and is midway between the sides 24. This main rib 27 is a runner in the molding process of the panel frame 17 as explained hereinbelow. This main rib or runner 27 and the perimeter members 24–26 have relatively large individual cross-sections as compared to the ribs 22, 23. The width of the side members 24 (FIG. 9) is substantially coincident with the height of the sides of the U of the channel shape of the panel 10.

Figure 3:
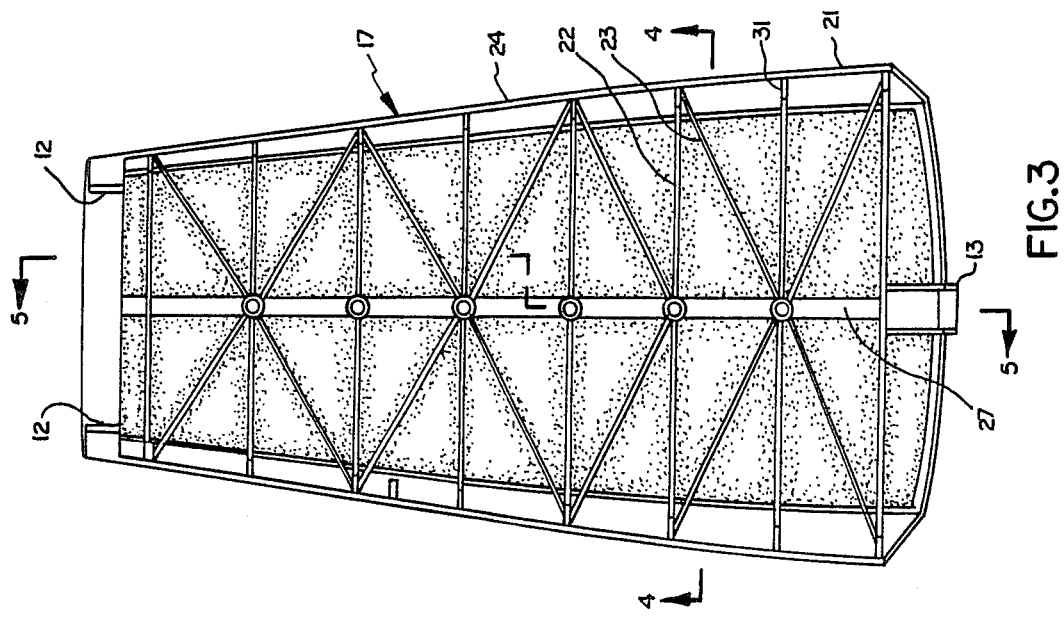
FIG. 3 is a rear inside view of the diffuser panel.
Figure 2:
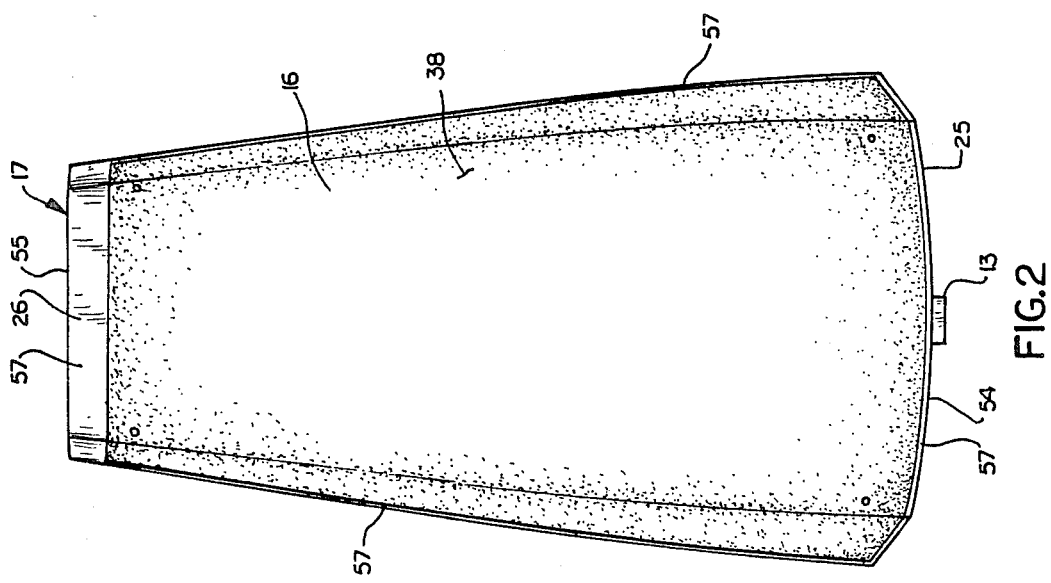
FIG. 2 is a front view of the diffuser panel.
Figure 1:
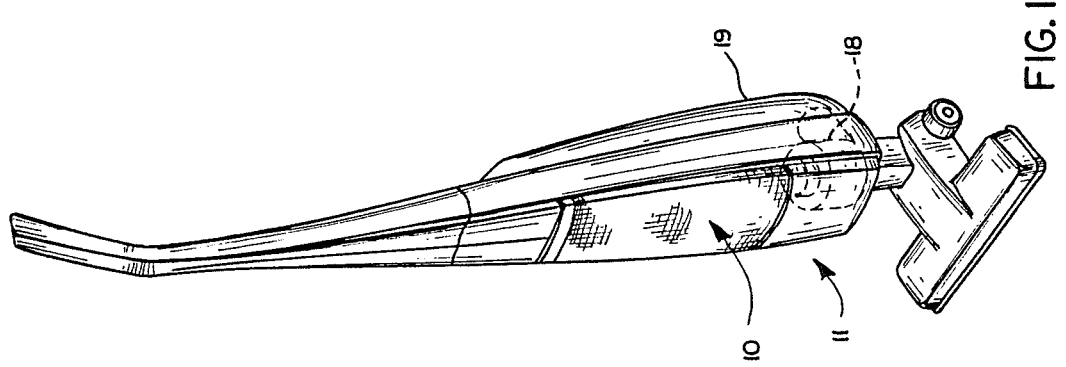
FIG. 1 is a perspective view of a lightweight upright vacuum cleaner having an air diffuser panel embodying the present invention.

As seen most clearly in FIG. 3, the stringers or ribs include elements 22 which lie in planes perpendicular to the main runner 27 and diagonal elements 23 which lie in planes which intersect the runner 27 at individual angles. The perpendicular ribs 22 have ends 31 which extend along the interior of the side members 24 to stiffen the frame against distortion. As shown, the cross-section height of the ribs 22, 23 is substantially greater than their width. This geometry avoids restriction of air flow through the fabric 16 while providing relatively high strength and stiffness.

In accordance with the invention, the frame 17 is molded in situ on the fabric web 16. FIGS. 6 and 7 illustrate a die set in which the frame 17 is molded in permanent assembly with the fabric 16. In the illustrated case, a die cavity 37 has a surface configuration which corresponds to the outside visible face designated 38 of the finished cover 10. A set of spring loaded pins 39 project through the surface of this die cavity 37 for registration with corresponding holes 41 precut in the fabric 16 and precisely align the fabric in the cavity. The fabric 16 is blanked or cut to shape by suitable known techniques with treatment of the plain cut edges being unnecessary to avoid unraveling as will be explained hereinbelow. Ordinarily, no separate mechanical, thermal, or chemical treatment of the cut edge of the blank including folding, stitching, heat fusing, solvent bonding or the like is required. The fabric blank is preferably cut so that its weave pattern is aligned with the longitudinal direction with the cover i.e. with its threads parallel and perpendicular to the main rib or runner 27.

With the fabric blank 16 in the mold cavity 37 and in registry with the pins 39, a core side 42 of the mold set 36 is positioned on the cavity side designated 43 so that the cavity 37 is closed. A main face 44 of the core 42 presses directly against an inside face 45 of the fabric 16. Channels 46–50 in the core face 44 correspond to and form the perimeter and rib network portions 22–26. The die set 36 is mounted in a conventional vertical injection molding press. Thermoplastic material, by conventional molding techniques is injected into the die cavity 37 through a series of gates 51 (one of which is shown in the section view of FIG. 7) spaced longitudinally along a central runner channel 52. The injected molten thermoplastic material flows laterally with respect to the runner channel 52 from the gates 51 through the rib network channels 49, 50 to the channel 48 corresponding to the side members 24 of the frame perimeter 21. The flowing injected material contacts the inner face 46 of the fabric 16 along the channels 49, 50 and stretches the fabric 16 laterally outwardly away from the runner channel 52 towards the outward margins designated 53 of the side frame members 24. A relatively large number of gates 51 are provided in the mold to ensure that the flow of injected frame material is laterally outward from the central runner channel 52 and there is essentially no tendency for such material to flow from one gate outwardly to the perimeter portion 21 of the frame and then inwardly along a rib channel 46, 47. The fabric blank 16 is cut to a size and configuration which, when made taut by viscous forces of the lateral and endwise flow of settable frame material, allows its edges to be slightly spaced from the outer margins 53, 54, 55 of the frame. In the finished product, this dimensioning of the fabric blank leaves a narrow reveal 57 on the perimeter portion 21 of the frame 17 exposed to view when the panel is installed on the housing 19. The reveal 57 (FIG. 9) is coplanar with the outer face of the fabric 16.

The settable material forming the frame 17 is a polymeric material preferably a thermoplastic such as ABS of a general purpose injection molding grade which has a melting point in a range of about 425° F. to about 525° F. and is molded using an injection molding machine barrel temperature of about 480° F. The fabric is preferably a synthetic polymeric material such as polyester which is also a thermoplastic with a melting point in a range of about 430° F. to about 550° F. A material suitable for the fabric, marketed by Milliken & Company, is designated S/3924 AFTON. The frame material is selected with a melting temperature which is sufficiently below that which would detrimentally affect the appearance of the outside surface of the fabric 16. The molten frame material in the channels 46 flows into direct contact with the fibers of the reverse side of the fabric 16 and, upon setting, it is permanently and tenaciously bonded to this surface. The resulting bond is exceptionally strong since the fibers of the fabric 16 are actually permanently embedded in the body of the frame 17. It will be understood that the main face 44 of the core 42 positively engages the reverse side 45 of the fabric 16 during the frame molding process so that molten frame material is excluded from the main area of this fabric face i.e. the area between the ribs 22, 23.

The plain cut marginal edge designated 61 (FIG. 9) of the fabric blank 16 is automatically finished during the frame molding process. This marginal edge is held against separation, fraying and raveling without additional attaching materials, labor or time. The bond of the frame material at this edge is sufficient to capture enough of the fibers of the fabric threads to preclude any significant unraveling of the fabric. The bond between the frame material 17, and fabric 16 is remarkably strong and permits the cover to be used in rigorous service such as where relatively high air pressure and air flow rates are developed by a vacuum motor unit and such air is discharged through the cover from a side on which the frame is disposed.

Figure 10:
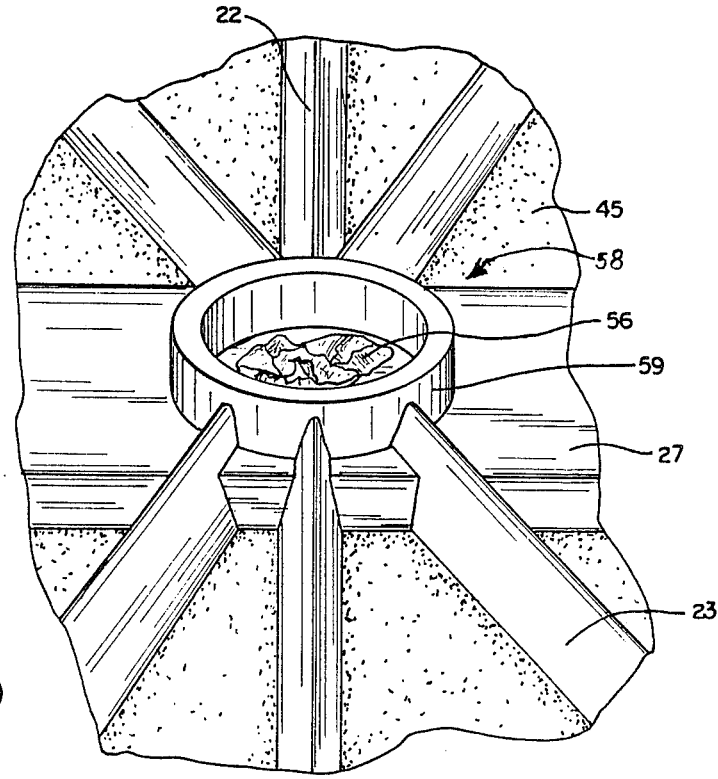
FIG. 10 is a greatly enlarged fragmentary perspective view of the inside of the diffuser panel at a typical gate section.

With reference to FIG. 10, gate areas 58 of the frame 17 are surrounded by and recessed in cylindrical cylindrical skirt formations 59 which protect the filter bag 15 retained by the cover 10 against abrasion with any sharp break off points 56 which might occur at the gates 51. Similarly, the corners and edges of the ribs 22, 23 and marginal frame member 24-26 are rounded to avoid abrasion of the bag 15.

The polymeric thermoplastic frame material, preferably, is filled with a suitable material such as ⅛" long chopped glass fiber, known in the art, (in a range of 5 to 20% and preferably 10 to 15% by weight) to resist the tendency for the frame to shrink upon thermal cooling and setting of the frame material. A high shrinkage rate of the frame material would otherwise result in a slackening of the tension in the fabric material and consequent puckering of such fabric.

The present invention in which a rigid framework is molded in situ on a decorative fabric web has applications other than in a vacuum cleaner air diffuser panel. Such applications, where air or sound transmission through a fabric wall is desired exist in static structures such as buildings, containers such as clothes hampers, mechanical devices, machinery, audio equipment and the like. Although the preferred embodiment of this invention has been shown and described, it should be understood that various modifications and rearrangements of the parts may be resorted to without departing from the scope of the invention as disclosed and claimed herein.

What is claimed is:

1. In a vacuum cleaner having a housing, a vacuum motor unit for drawing dirt laden air into the housing, and an air permeable cover on the positioned on the outside of said for diffusing air exhausted from the vacuum motor unit, the cover comprising a porous fabric carried on a rigid framework, the framework being injection molded of polymeric material in situ on the fabric, the framework being molded in such a manner being sufficiently rigid to maintain said fabric in a generally taut condition and reduce any tendency for ballooning, puckering, sagging or the like without separate fasteners or adhesives, the cover being of sufficient size in relation to the remainder of the vacuum cleaner to contribute to its appearance.

2. A vacuum cleaner set forth in claim 1, wherein said framework is molded primarily on a reverse inner face of the fabric.

3. A vacuum cleaner set forth in claim 1, wherein said framework includes a perimeter portion to which the edge of the fabric is permanently attached by a bond resulting from the molding of the framework thereon, the attachment by molding being sufficient to provide the exclusive means for securement between the framework and the fabric edge.

4. A vacuum cleaner as set forth in claim 3, wherein the framework is molded in a manner that tensions the fabric.

5. A vacuum cleaner as set forth in claim 3, wherein the framework includes injection molded gate areas arranged to induce flow of settable framework material during the molding process in directions generally away from the center of the fabric.

6. A vacuum cleaner as set forth in claim 5, wherein the fabric is generally rectangular in form and the gate areas of the framework induce flow of settable framework material both longitudinally and laterally away from the center of the fabric.

7. In a vacuum cleaner having a housing, a vacuum motor unit for drawing dirt laden air into the housing, and an air permeable cover on the housing for diffusing air exhasuted from the vacuum motor unit, the cover comprising a porous fabric carried on a rigid framework, the framework being injection molded of polymeric material in situ on the fabric, said framework including a perimeter portion to which the edge of the fabric is permanently attached by a bond resulting from the molding of the framework thereon, the attachment by molding being sufficient to provide the exclusive means for securement between the framework and the fabric edge, the fabric being dimensioned to provide an edge which is spaced slightly from the marginal areas of the framework perimeter portion such that the framework provides a reveal at such marginal areas.

8. A vacuum cleaner set forth in claim 7 wherein the cover is secured on the housing in a position where the reveal is visually exposed.

9. A vacuum cleaner set forth in claim 7 wherein the framework includes a gridwork of rib elements intermediate the framework perimeter portion, said gridwork being molded in situ on the inside of the fabric material, the attachment of the gridwork being sufficiently strong to resist forces of air pressure produced by the vacuum motor unit.

10. A vacuum cleaner set forth in claim 9 wherein said rib elements are relatively narrow in the plane of the cover as compared to their height in a plane perpendicular to the cover whereby the frame is relatively stiff and a relatively high surface area of fabric is free of obstruction by such rib elements so that a relatively large air flow area is available through the fabric.

11. A vacuum cleaner set forth in claim 10 wherein the cover has a U-shaped cross section, said cover includes integral securement means engageable and disengageable with the housing by resiliently flexing the cover to reduce its width across the sides of the U-section.

12. A vacuum cleaner as set forth in claim 1, wherein the framework is molded on the innerside of the cover, the framework including centrally disposed gate areas.

13. In a vacuum cleaner having a housing motor unit for drawing dirt laden air into the housing and an air permeable cover on the housing for diffusing air exhausted from the vacuum motor unit, the cover comprising a porous fabric carried on a rigid framework, the framework being injection molded of polymeric material in situ on the fabric, the framework being molded on the innerside of the cover, the framework including centrally disposed gate areas, the framework including integral molded protective skirt means immediately surrounding a projecting inwardly of said gate areas, said skirt means reducing the risk of abrasion and tearing of a filter bag contained by the cover by any sharp breakage points in the gate areas.

14. An appearance panel for visually screening a space while allowing passage of air therethrough comprising a frame and a woven fabric extending across the frame, the frame being relatively rigid and including a perimeter portion and an integral rib cage portion bridging a zone bounded by a perimeter portion, the frame being molded in situ against the fabric and thereby being permanently bonded thereto, the frame being molded in such a manner and being sufficiently rigid to maintain said fabric in a generally taut condition and reduce any tendency for ballooning, puckering, sagging or the like without separate fasteners or adhesives.

15. An appearance panel as set forth in claim 14, wherein the frame comprises a thermoplastic material having a melting temperature suitable for molding which is not detrimental to the appearance of the fabric.

16. An appearance panel as set forth in claim 15, wherein the fabric is a synthetic polymeric thermoplastic material having a melting temperature substantially higher than the melting temperature of the frame material.

17. An appearance panel as set forth in claim 14, wherein said fabric is an upholstery type fabric and the frame is molded primarily on the reverse side of the fabric.

18. An appearance panel as set forth in claim 14, wherein the frame includes a filler material carried in the polymeric material which reduces the amount of shrinkage occurring in the frame as it sets upon cooling from the molding temperature to room temperature.

19. A method of making an appearance panel comprising the steps of providing a mold having formations arranged to form a framework including a perimeter, placing a woven fabric sheet in the mold in a position where it is adjacent the perimeter, introducing settable polymeric material into the mold to fill the perimeter formations and contact the fabric while excluding such settable material from zones of the fabric which collectively form a major portion of its total area, the settable material being introduced into the mold at gate areas which induce flow of the settable material in directions generally away from the center of the fabric whereby such flow tends to draw the fabric taut to avoid ballooning, puckering sagging or the like, allowing the polymeric material to rigidify to take the shape of the perimeter formations of the mold and to permanently bond to the fabric by permanently entrapping the fibers of the fabric threads, and removing the fabric and frame molded thereon from the mold.

20. A method of making an appearance panel comprising the steps of providing a mold having formations arranged to form a framework including a perimeter and stringers extending inward from the perimeter, placing a woven fabric sheet in the mold in a position where it is adjacent the perimeter and stringer portions, introducing settable polymeric material into the mold to fill the perimeter and stringer formations and contact the fabric while excluding such settable material from zones of the fabric which collectively form a major portion of its total area, allowing the polymeric material to rigidify to take the shape of the perimeter and stringer formations of the mold and to permanently bond to the fabric by permanently entrapping the fibers of the fabric threads, and removing the fabric and frame molded thereon from the mold, the settable material being introduced in a central region and being allowed to flow laterally outwardly towards the perimeter formations and simultaneously draw the fabric taut in the mold.

21. A method as set forth in claim 20 wherein the settable frame material is provided as a thermoplastic which is filled with an additive substance which reduces dimensional shrinkage of the thermoplastic material and thereby avoids slackening in the fabric.

22. A method as set forth in claim 21 wherein the fabric is inserted in a generally smooth faced mold cavity and a core portion of the mold has channel formations forming substantially all of the frame on one side of the fabric.

23. A method as set forth in claim 20, wherein the mold is provided with formations arranged to form stringers extending inwardly to the perimeter.

* * * * *

UNITED STATES PATENT AND TRADEMARK OFFICE
CERTIFICATE OF CORRECTION

PATENT NO. : 4,709,443
DATED : December 1, 1987
INVENTOR(S) : James E. Bigley

It is certified that error appears in the above-identified patent and that said Letters Patent is hereby corrected as shown below:

Column 5, Claim 1, line 37, after "said" insert --housing--.

Column 6, Claim 13, line 45, after "housing" insert --, a vacuum--.

Column 6, Claim 13, line 46, after "housing" insert -- , --.

Signed and Sealed this

Seventeenth Day of May, 1988

Attest:

*Attesting Officer*

DONALD J. QUIGG

*Commissioner of Patents and Trademarks*